United States Patent
Ott et al.

(10) Patent No.: US 9,973,511 B2
(45) Date of Patent: May 15, 2018

(54) METHOD AND SYSTEM FOR ENABLING ACCESS OF A CLIENT DEVICE TO A REMOTE DESKTOP

(71) Applicant: TOCARIO GMBH, Stuttgart (DE)

(72) Inventors: Tobias Ott, Stuttgart (DE); Mario Lombardo, Stuttgart (DE)

(73) Assignee: Tocario GmbH, Stuttgart (DE)

( * ) Notice: Subject to any disclaimer, the term of this patent is extended or adjusted under 35 U.S.C. 154(b) by 193 days.

(21) Appl. No.: 14/966,796

(22) Filed: Dec. 11, 2015

(65) Prior Publication Data
US 2016/0099948 A1    Apr. 7, 2016

Related U.S. Application Data

(63) Continuation of application No. PCT/EP2014/061308, filed on Jun. 2, 2014.

(30) Foreign Application Priority Data

Jun. 14, 2013    (EP) .................................... 13172060

(51) Int. Cl.
*H04L 29/06*    (2006.01)
*G06F 9/44*    (2018.01)
(Continued)

(52) U.S. Cl.
CPC .......... *H04L 63/102* (2013.01); *G06F 9/4445* (2013.01); *G06F 9/45558* (2013.01);
(Continued)

(58) Field of Classification Search
CPC ..... H04L 63/102; H04L 63/20; H04L 67/141; G06F 9/4445; G06F 9/45558; G06F 9/54
See application file for complete search history.

(56) References Cited

U.S. PATENT DOCUMENTS 6,219,706 B1 *   4/2001   Fan ..................... H04L 63/0254
                                                            709/225
6,826,694 B1 *  11/2004   Dutta .................. H04L 63/0245
                                                            709/224
(Continued)

OTHER PUBLICATIONS

Jung et al., Instant Virtual Desktop System with Dynamic I/O Client Device, Dec. 2011, International Conference on Engineering and Industries, pp. 1-3 (Year: 2011).*

(Continued)

*Primary Examiner* — Kenneth W Chang
(74) *Attorney, Agent, or Firm* — Brake Hughes Bellermann LLP

(57)    ABSTRACT

A computer implemented method, computer program product, and systems for enabling access of a client device to a remote desktop. The remote desktop is implemented within a remote virtual machine engine (302) selected from one or more virtual machines running on a virtual host (301). A connection management component receiving from the client device 200 a connection request wherein the connection request is directed to establishing a connection between the client device (200) and the remote virtual machine engine (302). If authorization data associated with the connection request complies with a predefined access data structure and corresponding access rules, the connection management component requests destination data of the remote virtual machine engine (302), the destination data allowing to interact with the virtual machine engine (302) and, in response, receiving the destination data. Then it sends to a proxy service (102) a session request based on the destination data for establishing a session (1010) with the remote virtual machine engine (302) through the proxy service (102) in accordance with the authorization data. It receives from the proxy service (102) proxy connection data configured to allow the client device to establish a proxy connec- (Continued)

tion (1009) via a wide area network (400). The proxy connection data is then sent to the client device (200) to enable the client device (200) for establishing the proxy connection between the client device (200) and the proxy service (102) over the wide area network (400) to access the remote virtual machine engine (302) through the session with the remote virtual machine engine (302).

20 Claims, 3 Drawing Sheets

(51) Int. Cl.
*G06F 9/54* (2006.01)
*G06F 9/455* (2018.01)
*H04L 29/08* (2006.01)

(52) U.S. Cl.
CPC ............ *G06F 9/54* (2013.01); *H04L 63/0281* (2013.01); *H04L 63/20* (2013.01); *H04L 67/025* (2013.01); *H04L 67/141* (2013.01); *G06F 2009/45587* (2013.01); *G06F 2009/45595* (2013.01)

(56) References Cited

U.S. PATENT DOCUMENTS

| | | | |
|---|---|---|---|
| 2005/0102377 A1 | 5/2005 | King et al. | |
| 2006/0230105 A1* | 10/2006 | Shappir | H04L 67/08 709/203 |
| 2009/0216975 A1* | 8/2009 | Halperin | G06F 9/45537 711/162 |
| 2009/0276771 A1* | 11/2009 | Nickolov | G06F 9/4856 717/177 |
| 2010/0138475 A1 | 6/2010 | Frank et al. | |
| 2010/0146504 A1* | 6/2010 | Tang | G06F 9/45537 718/1 |
| 2010/0223309 A1* | 9/2010 | Benari | G06F 17/30327 707/912 |
| 2010/0241694 A1 | 9/2010 | Jensen et al. | |
| 2011/0131330 A1 | 6/2011 | Beaty et al. | |
| 2011/0251992 A1* | 10/2011 | Bethlehem | H04L 12/2863 707/610 |
| 2014/0018033 A1* | 1/2014 | Luna | H04W 28/0215 455/405 |

OTHER PUBLICATIONS

Newer Cisco SBA Guides Available, Cisco Systems, Inc., Aug. 2012, 47 pages.
Citrix Virtual Desktop Handbook, Version 5.x, An architect's guide to desktop virtualization, Citrix Systems, Inc., Sep. 2013, 230 pages.
VMware Horizon View Administration, View 5.2, VMware, Inc., 2013, 462 pages.
VMware Horizon View Architecture Planning, Horizon View 5.2, VMware, Inc., 2009-2013, 86 pages.
VMware Horizon View Integration, View 5.2, VMware, Inc., 2013, 94 pages.
The VMware Reference Architecture for Stateless Virtual Desktops on Local Solid-State Storage with VMware View 5, VMware, Inc., Sep. 2012, 58 pages.
Virtualization Desktop Infrastructure, Windows Server 2012, Microsoft Corporation, 2012, 25 pages.
Lethanhman, Cao et al., "A Multipath Approach for Improving Performance of Remote Desktop Transmission", International Journal on Advances in Networks and Services, vol. 3, No. 1 and 2, Sep. 5, 2010, 10 pages.
International Search Report for International Application No. PCT/EP2014/061308, dated Jul. 18, 2014, 4 pages.

* cited by examiner

METHOD AND SYSTEM FOR ENABLING ACCESS OF A CLIENT DEVICE TO A REMOTE DESKTOP

RELATED APPLICATION

This application is a continuation of International Application No. PCT/EP2014/061308, filed Jun. 2, 2014, which claims priority to European Application No. 13172060.9, filed Jun. 14, 2013, the contents of each are hereby incorporated by reference in their entireties.

TECHNICAL FIELD

The present description generally relates to electronic data processing, and more particularly, relates to methods, computer program products and systems for remote client access to a virtual machine.

BACKGROUND

There exist commercial solutions to remotely access a virtual PC or desktop with local system behavior within a multi-user environment over a wide area network (WAN) such as the Internet. For example, video and input devices as well as optical media and/or USB redirection can be subject to such a remote access. Some solutions enable a client to access a MICROSOFT WINDOWS desktop over the Internet. However, Windows is the only supported operating system and any display information remains hidden for the user until the remote desktop has completed the ramp up. Other available solutions are able to publish platform independent desktops over a network, but they are designed for local networks (LAN) only and/or they only support single-tenant behavior.

Some solutions do video grabbing within the operating system which can result in the following consequences:

The operating system must be up and running without errors.
A piece of software must be installed (perhaps as part of the operating system).
Network connectivity to the remote desktop is required.
VPN connections cannot be opened by the remote desktop.

Some solutions share a single operating system for multiple clients at a time. In such cases, a user is unable to administer his/her system like a user dedicated system. The user is restricted in operations like changing system settings, installing software on demand, or restarting the system.

Some available solutions enable a client device to access the virtual graphic hardware and other I/O devices of a desktop or server over the internet protocol. Such solutions are designed to be used for maintenance access to a system. Such solutions can neither be used effectively in a multi customer environment nor over wide area networks. This can result in the following consequences:

The solutions are not designed for low bandwidth (WAN).
The solutions are not optimized for latency difficulties.
The solutions only support single-tenancy (i.e. no multiple clients at a time).
The solutions may not meet WAN security requirements (encryption, authorization, authentication, integrity).

SUMMARY

Therefore, there is a need to improve prior art systems to support remote desktop access for client devices over a wide area network independent from the operating system.

The solution to this problem is making use of virtual machines. The term "virtual machine" is often used for an operating system running on virtual hardware. In fact, a virtual machine is the actual virtual hardware. There is no coherence between a virtual machine and any software running on it (e.g., the operating system). In more detail, a typical virtual machine has two parts: a virtualized part and an emulated part. Real existing resources (i.e., hardware) can be provided to a virtual machine by a hypervisor. When referring to virtualization—and not emulation—the virtualized part comprises at least memory (RAM) and processor resources. Additional hardware that is not existent in the virtualized part or not capable to be partitioned can be emulated. The software providing the additional emulated or sometimes para-virtualized hardware for the virtual machine is referred to as virtual machine engine hereinafter. The virtual machine engine is a piece of software running on a virtual host with one instance per virtual machine. In other words, the virtual machine engine, when started on a virtual host, can be seen as a software process and for each virtual machine such a virtual machine engine process is running.

The problem is solved by described embodiments, such as a computer implemented method, computer program product, and computer system according to the independent claims, to enable access of a client device to a remote desktop implemented as an operating system running on a remote virtual machine engine. In other words, the virtual machine engine runs on a host that is remote to the client device. The virtual machine engine provides the functionality of an operating system to the client device so that the combination of client device, virtual machine engine and host appears to the user like the user's desktop. A virtual machine is a software implemented abstraction of the underlying hardware, which is presented to the application layer of the system. Virtual machines may be based on specifications of a hypothetical computer or emulate the computer architecture and functions of a real world computer. Virtual machines have filtered access to a host processor and virtual memory. This access can be managed by virtualization features of the processor itself. Memory translation tables (virtual machine to host) can also be handled by the processor.

A remote desktop, as used hereinafter, is to be understood as an instance of software emulating remotely all functions that a user normally can execute on a local client device and providing such functions through a remote session, such as a terminal session.

The remote virtual machine can be instantiated on a virtual host as a virtual machine engine. A virtual host as used hereinafter corresponds to an operating system which is configured to run one or more virtual machine engines. The remote virtual machine engine can be selected from one or more remote virtual machine engines running on the virtual host. Further, in a computer system landscape, there can be one or more virtual hosts with running virtual machines which may all be accessible by the client device.

A user may enter user credentials on the user's client device to load a list of available remote virtual machines from a remote system. The remote system can be hidden from the user but the client device may have knowledge about a connection management component from which a list of available remote virtual machines can be retrieved. The user may select a target destination from that list and send a corresponding connection request to the connection management component.

The connection management component receives the connection request which is directed to establish a connection between the client device and the remote virtual machine engine which has been selected as a target destination. In other words, the connection request indicates to the connection management component that the client device intends to access the remote desktop implemented through the remote virtual machine engine. The user credentials include authorization data for the user. The authorization data can be transmitted separately or as part of the connection request. For data exchange with other components the connection management component has a management interface which may include one or more specific interfaces which are tailored to the communication requirements with the respective components.

The connection management component has an access policy component which includes a predefined access data structure and corresponding access rules configured to evaluate the authorization data with regard to whether the requesting user is allowed to open a connection to the remote desktop as a target destination. Through the access policy the connection management component can define which user can access which remote virtual machine engine and how. For example, it may be allowed to establish a display connection but it may be forbidden to use file or clipboard transfer. USB redirection could be allowed or denied. Any combination is possible. If the authorization data associated with the connection request complies with the access policy, that is, if the requesting user has the respective access rights to open the connection, the connection management component requests destination data of the remote virtual machine engine. As explained earlier, the remote virtual machine engine is instantiated on a virtual host. The destination data may either be requested from the respective virtual host or from an intermediate abstraction software between the connection management component and the virtual host. When the virtual machine is instantiated it automatically provides a virtual machine engine and the connection management component is enabled to control the virtual machine engine and the remote virtual machine itself. In computing, a hypervisor is a virtual machine monitor which is a piece of computer software, firmware or hardware that creates and runs virtual machines. A hypervisor can run one or more virtual machines on the virtual host. The hypervisor presents the operating system(s) of the remote desktop virtual machine(s) a virtual operating platform and manages the execution of the virtual machine operating systems. Multiple instances of a variety of operating systems may share the virtualized hardware resources. In contrast, a virtual machine engine is dedicated to a respective virtual machine. It provides non-shared hardware resources. For example, control signals from input devices of the client device (e.g., mouse, keyboard, touch screen, etc.) can be forwarded to the virtual machine engine completely independent from the operating system. In the opposite direction visual information from the remote client also can be provided irrespective of the operating system. As a consequence, the suggested computer system is platform independent in the sense that a communication is enabled independently from the operating systems used by the client device and inside the remote virtual machine.

In response to the destination data request the connection management component receives the destination data of the virtual machine engine as the requested destination data of the remote virtual machine. In other words, although the requested destination data is directed to the remote virtual machine the system intends to allow the access to the remote virtual machine only through the respective virtual machine engine and therefore provides the destination data of the virtual machine engine. This destination data may pass one or more intermediates. In other words, any number of intermediate components, for example, components to provide additional abstraction levels, can be used in the context of the proposed communication concept without affecting the principles of the communication concept as claimed.

The connection management component then sends a session request for establishing a session with the remote virtual machine engine to a proxy service component. The session request specifies that the session should be opened by the proxy service in accordance with the authorization data. In general such sessions are established between a software running within virtual machines and client devices belonging to the same local area network. Using a virtual machine engine in combination with a proxy service allows connections between client devices and remote desktop virtual machines over wide area networks like the Internet. Further, by using the management component for controlling the virtual machine engine multi-tenancy is enabled. In other words, multiple groups can use this environment without knowing or interfering with each other.

The proxy service component responds to the session request by providing proxy connection data which is configured to allow the client device to establish a proxy connection via a wide area network. In other words, with the proxy connection data a proxy client of the client device can open a session with the proxy service component over the Internet. To enable the client device for such purpose the connection management component sends the proxy connection data to the client device.

The proxy client of the client device opens the session to the proxy service component over the wide area network and the proxy service component forwards the communication to the respective target destination, i.e. the remote virtual machine implementing the remote desktop for the client device, via the respective virtual machine engine. The proxy connection and the respective session are identified by a unique identifier. The proxy service can be controlled by the management service provided by the connection management component and can push its configuration data to the related proxy client.

In one embodiment, the connection management component and the proxy service component may run in a dedicated management device. However, the management device may also be part of one or more virtual hosts running the virtual machines.

In one embodiment, the established proxy connection between the proxy client of the client device and the proxy service may be a secure connection (e.g., using Transport Layer Security (TLS) or Secure Socket Layer (SSL)).

In one embodiment, the proxy service receives a data optimization indicator from the client device. The data optimization indicator is based on technical constraints of the client device, such as for example types of connection or specific protocols supported by the client device. The proxy service can negotiate with the client device a specific optimization protocol selected from a predefined set of optimization protocols wherein the specific optimization protocol is associated with the data optimization indicator.

In one embodiment, the connection management component can store user data of a plurality of users where each user may use a corresponding client device. In addition, user group data of a plurality of user groups can be stored. A user group has a subset of the plurality of users and can be associated with a plurality of remote virtual machines. In other words, the system supports the organization of multiple customers where each customer can be represented by a user group included the users of the respective customer. For each customer a dedicated set of remote virtual machines can be assigned to the respective user group. The mapping of the plurality of remote virtual machines to a user group defines a dedicated virtual local area network for the respective customer. This allows providing remote desktops for a plurality of different customers on the same virtual host in such a way that each customer can have respectively customized views through the corresponding remote desktops. Further, a user group may be a child of one or more higher-level user groups. A privileged user of a user group may be allowed to manage the access control structures of his direct parent group. Additional access by privileged users of a higher-level group may be explicitly agreed between a parent user group and a child user group to enable a privileged user of a parent user group to access remote virtual machine engines associated with the child user group.

In one example embodiment, the predefined access data structure and corresponding access rules (access policy) may store any one of the following access rules: allow or deny display connections (maybe partial), allow or deny keyboard connections (maybe with key restrictions), allow or deny mouse connections, allow or deny file transfer, allow or deny clipboard transfer (for both directions separately: from the virtual machine and to the virtual machine), allow or deny USB redirection, define blacklists and/or whitelists for USB redirection device classes (e.g., storage, audio, . . . ), define access time for every access rule, define client system IDs for restricting access from specific client machines, and define network blacklists/whitelists to restrict client access to specified subnets (such as a company, a provider, a city or a country). While establishing the proxy connection between the proxy client and the proxy service only connection protocols may be enabled which are allowed by the access rules for the received authorization data. For example by using protocols which are able to directly grab the video stream of the remote desktop from the respective virtual machine engine the example embodiments are able to bypass at least the following problems associated with existing solutions:
  a. a feature for multiple connections to the same desktop at the same time for collaboration;
  b. apply protocol optimization to make the remote session efficient with WAN connections;
  c. provide additional security options to prevent clear text transmissions over the Internet; and/or
  d. be independent from the remote desktops network (e.g. and make it possible to let the desktop connect to a foreign VPN network)

Further aspects will be realized and attained using the elements and combinations particularly depicted in the appended claims. It is to be understood that both, the foregoing general description and the following detailed description are exemplary and explanatory only and are not restrictive as described.

DETAILED DESCRIPTION

Figure 1:
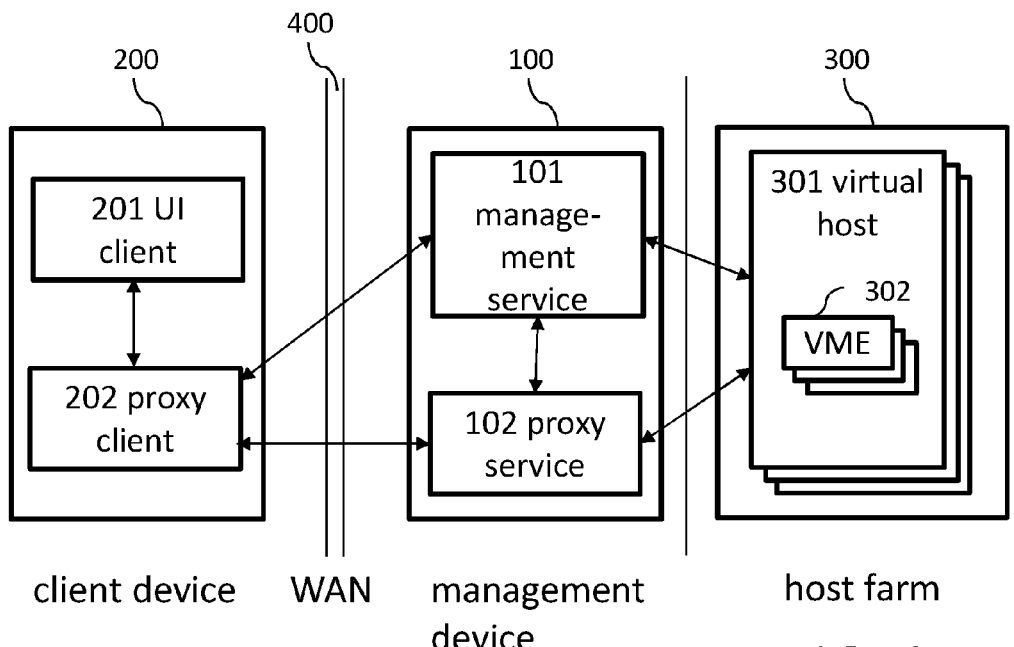
FIG. 1 is a simplified block diagram of components used by example embodiments.

FIG. 1 is a simplified block diagram of components used by example embodiments. The components can be communicatively coupled to allow communication between the components. Such communication may occur through appropriate interfaces via networks (e.g., wide area or local area networks, wireless networks, etc.) when the components are physically separated. Components implemented on the same physical device may communicate through appropriate interfaces via a device internal bus. Bidirectional communication between components is illustrated by bidirectional arrows between the respective components. Unidirectional communication is illustrated by unidirectional arrows.

The components can enable a client device 200 to open a session with a remote desktop implemented within a remote virtual machine engine 302 running on a virtual host 301. For example, the client device 200 can be a conventional personal computer (PC), a tablet PC, a smartphone or any other computing device which allows user interaction with a user via a user interface (UI). The client device has a UI client 201 (e.g., a browser or a virtual network computing (VNC) viewer) providing functions for input or output of data (I/O functions). The UI client may support video data, audio data, or any other appropriate data streams or formats for user interaction. For example, the user may be provided with a graphical representation of the desktop via a display device (e.g., monitor device) that allows the user to perform control actions, such as selecting an icon by clicking on the icon with a pointing device (e.g., mouse) or inputting data into a corresponding data entry field representation. The UI client 201 can communicate with a proxy client 202 of the client device 200. The proxy client 202 can be configured to connect to a proxy service 102 over a wide area network WAN 400. For example, WAN 400 can be the Internet and the connection between the proxy client and the proxy service can be a secured TLS or SSL connection which is used with a binary protocol (e.g. a SSH tunnel or a more advanced protocol for this use case). The proxy service 102 can be configured to listen continuously on port 443/TCP (default HTTPS port) to enable the proxy client 202 on client devices 200 to connect to the proxy service 102 even if the client device 200 is behind a firewall which blocks nonedefault outgoing connections.

Besides a SSH tunnel, which just forwards a connection and does not make any optimizations and does not provide any filter techniques a more advanced proxy protocol can be used.

Such a more advanced proxy protocol can be a protocol that behaves for every network infrastructure device like a HTTPS protocol but is in fact a stateful protocol. The connection may be initiated by the proxy client 202. For example, the connection can be TLS encrypted. When encryption is used, the TLS handshake starts directly after the TCP connection has been established. If needed a re-handshake for TLS may occur anytime during a proxy session. Inside the TLS connection the client authenticates itself with a unique token. This token can be generated by the management service of the connection management component 101 when sending a respective request to the proxy service 102. This token is bound to a data structure at the proxy service 102 that saves any one the following information:
- TLS context data
- proxy client connection data (e.g., source IP/port)
- access control lists (ACLS) for proxy clients (e.g., machine IDs, source networks)
- last data transfer (for timeout function)
- a set of up to maximum number of remote stream structures (e.g., eight)

A remote stream structure is a connection handle for the proxy to save the data stream related information. For example, stream #0 may always be used for proxy internal communication. Then streams #1 to #7 can be available for remote desktop payload. The remote stream structure can save any one the following information:
- stream function (e.g., desktop, USB, clipboard, . . . )
- protocol type at the endpoint (e.g., specific block storage, USB-over-IP, . . . )
- protocol endpoint (the socket listener of the actual software on the virtual host, where the stream is targeted to; e.g., the virtual machine engine 302)
- unique ID (e.g., universally unique identifier UUID) of the remote virtual machine engine 302 to which the connection relates
- connection status (e.g., WAITING, CONNECTED, RECONNECTING)
- optimizations proposed by the client (e.g., compression algorithm, codec translation, . . . )
- optimization negotiated (e.g., kind of compression algorithm, codec translation, . . . )
- optimization parameter (e.g., dictionary size, bitrates, . . . )
- statistical information (e.g., setup times, transferred data, . . . )
- ACLs for proxy clients (e.g., protocol restrictions)
- and a set of up to 256 channels For example, one stream may be dedicated to exactly one function. At least one payload stream (i.e., a stream which is not always used for proxy internal communication) may be set up prior to the proxy client 202 connecting with the proxy service 102. Stream changes (e.g., initiated by the management service) during an active proxy session can be pushed immediately from the proxy service 102 to the proxy client 202. Once the last stream (#1 to #7) terminates the whole session can be terminated by the proxy service 102.

The underlying paradigm can be described in that the proxy client 202 is allowed to send optimization proposals at any time to the proxy service 202 through stream #0 and channel #0 as long as the proxy connection exists. However, it is not allowed to apply any change before the proxy service 102 pushes a configuration change back to the proxy client 202. Changes that a proxy service 102 can initiate may correspond to any one of the following messages:
- open a stream (e.g., with related parameter)
- close a single channel or a whole stream
- terminate the session
- change optimization level of a specific function/stream.

The proxy client 202 may send one of the following messages over the proxy service stream (stream #0, channel #0):
- inform that the connection has been opened by the client/user
- inform that the connection has been closed by the client/user
- terminate the session
- proposal of optimizations for established streams Initially the components behind the WAN 400 may be hidden from the client device 200 with the exception of a connection management component 101 running on a management device 100. The management device can be any appropriate computing device with appropriate interfaces. For example, a standard server computer may be used. The connection management component 101 provides a management service which is the primary point of contact for the client device 200 to request a connection for accessing a remote desktop which is running within a virtual machine engine 302 on a virtual host 301. For example, the management service can provide a list of available remote desktops to the client device. Based on such list the user can make a selection of the remote desktop to be used. The client device 200 can send a corresponding connection request from the proxy client 202 to the connection management component 101. The proxy client may also send credentials of the user (authorization data) which can indicate to the management service which remote desktops can be accessed by the user.

Figure 3:
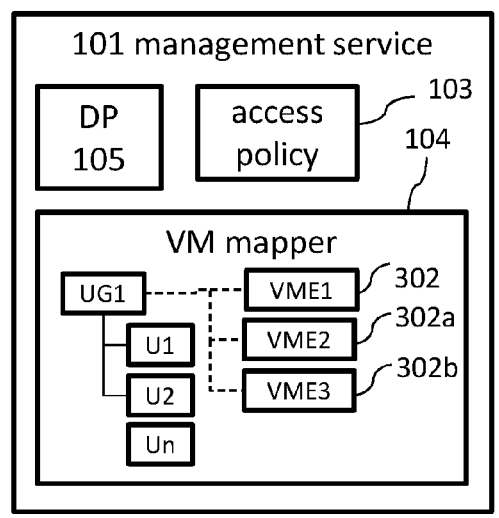
FIG. 3 is a simplified block diagram of a connection management component according to example embodiments.

Turning briefly to FIG. 3 showing a more detailed view of the connection management component 101. The management service can include the provisioning of an access policy 103 which includes a predefined access data structure and corresponding access rules for checking the compliance of the user's authorization data with the access rules defined for the virtual machine engine 302. In case of compliance, a data processing component 105 can generate a destination data request to request destination data of the remote virtual machine engine 302 implementing the remote desktop. This request can be sent directly to the corresponding virtual host 301 (cf. FIG. 1) itself or to an intermediate component (not shown).

Turning back to FIG. 1, a host farm 300 may run one or more virtual hosts 301. A virtual host 301 can be an appropriate computing device such as a standard server computer. A virtual host 301 and the management device 100 can be the same physical machine or can be separate physical machines. On each virtual host 301 one or more virtual machine engines 302 can run wherein each virtual machine engine may implement a remote desktop.

Figure 2:
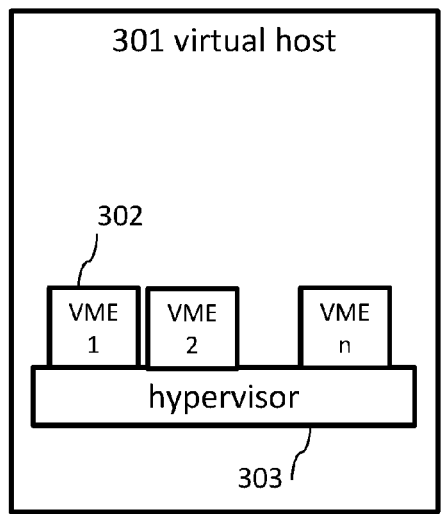
FIG. 2 illustrates a virtual host with its hypervisor and virtual machine engines according to example embodiments.

Turning briefly to FIG. 2, the virtual host 301 provides a hypervisor 303 which provides computing resources such as processor time or memory to a plurality of virtual machine engines (VME1, VME2, . . . , VMEn). A virtual machine engine 302 is an encapsulated software component, within which a remote desktop can be implemented. The virtual machine engine 302 provides virtual devices, such as mouse, keyboard or video, to the inner virtual machine (e.g., a remote desktop which is running within the encapsulated software component) and provides interfaces between these virtual devices and the virtual host 301 on which the virtual machine engine 302 is running on. Connecting to such an interface for remotely accessing the virtual machine engine 302 allows successful access to the virtual machine independent from the operating system running within the virtual machine.

Turning back to FIG. 1, the virtual host 301 finally responds to the request of the management service by sending the destination data of the virtual machine engine 302. The management service can then send to the proxy service 102 a session request for establishing a session with the virtual machine engine 302 in accordance with the authorization data. Such a session request can contain the destination data of the virtual machine engine 302 and types and options of the connection which should be allowed when a proxy client 202 connects with the appropriate session identifier. If, for example, the policy allows a display connection and USB redirection but denies file transfer, the opened proxy connection between proxy client 202 and proxy service 102 may just support the two allowed connection types.

With receiving a session request the proxy service 102 prepares a new proxy session to the requested destination with a unique session identifier and the requested connection policies. The proxy service 102 is now prepared for accepting a request of the proxy client 202 to establish a proxy connection if the provided session identifier is correct and the establishing is done within the allowed time (e.g., within 30 seconds). Otherwise the proxy session may be abandoned due to security reasons. After preparing the new proxy session the proxy service 102 responds to the management service 101 with the connection data for the proxy client 202. The response can include the session identifier and the external IP data to reach the proxy service over wide area networks, such as the Internet.

The management service 101 sends the proxy connection data to the proxy client 202. With establishing a proxy connection with the proxy service 102 the proxy client 202 receives the connection policies from the proxy service 102 which are allowed for this connection. Depending on the allowed connections and options the proxy client 202 is then able to provide access to the requested remote virtual machine engine 302. For example the UI client 201 is then able to communicate directly with the virtual machine engine 302 and enables the user to interact with it.

FIG. 3 is a simplified block diagram of a connection management component according to an example embodiment. The example shows how access management and user-to-virtual-machine mapping can be implemented. The management service 101 stores user data of a plurality of users (U1, U2, . . . , Un) and further can store user group data of a plurality of user groups wherein a user group (UG1) has a subset (U1, U2) of the plurality of users and is associated with a plurality of remote virtual machine engines (302, 302a, 302b). The plurality of remote virtual machines is mapped to a user group dedicated virtual local area network. The plurality of user groups can be arranged in a group hierarchy where at least one user group is a parent (not shown) of the user group (UG1) and the mapping of the plurality of remote virtual machine engines (302, 302a, 302b) to the plurality of users within the user group (UG1) can occur at the hierarchy level of the parent user group. User groups having other user groups as children can be referred to as multi hierarchical super groups. Such multi hierarchical super groups also may include users as children. A user group has a subset of the plurality of users and is associated with a plurality of remote virtual machines (302, 302a, . . . ). All virtual machines within a user group are mapped into a dedicated virtual local area network. All users within a user group can be allowed to establish a connection with a virtual machine engine (302) of the same user group. N-to-N mappings between the users and virtual machines within a user group are possible. A specific user group can allow users of its parent user group to gain access to the virtual machines of the specific user group. For example, this may be used to enable software vendors and service providers implemented as super groups to remotely support and manage their customers' environments when the customers are implemented as child user groups of the respective super groups. However, the access of super group users to child group virtual machines may depend on the allowance by the child user group. In other words, the access of software vendors or service providers to the remote virtual machines of their customers may only be possible if allowed by the customer. The access policy 103 can define details regarding which types of connections are allowed and how a user can communicate with a remote virtual machine.

The access policy 103 may store any one of the following access rules: allow or deny display connections (maybe partial), allow or deny keyboard connections (maybe with key restrictions), allow or deny mouse connections, allow or deny file transfer, allow or deny clipboard transfer (for both directions separately: from the virtual machine and to the virtual machine), allow or deny USB redirection, define blacklists and/or whitelists for USB redirection device classes (such as storage, audio, . . . ), define access time for every access rule, define client system IDs for restricting access from specific client machines, and define network blacklists/whitelists to restrict client access to specified subnets (such as a company, a provider, a city or a country).

Figure 4:
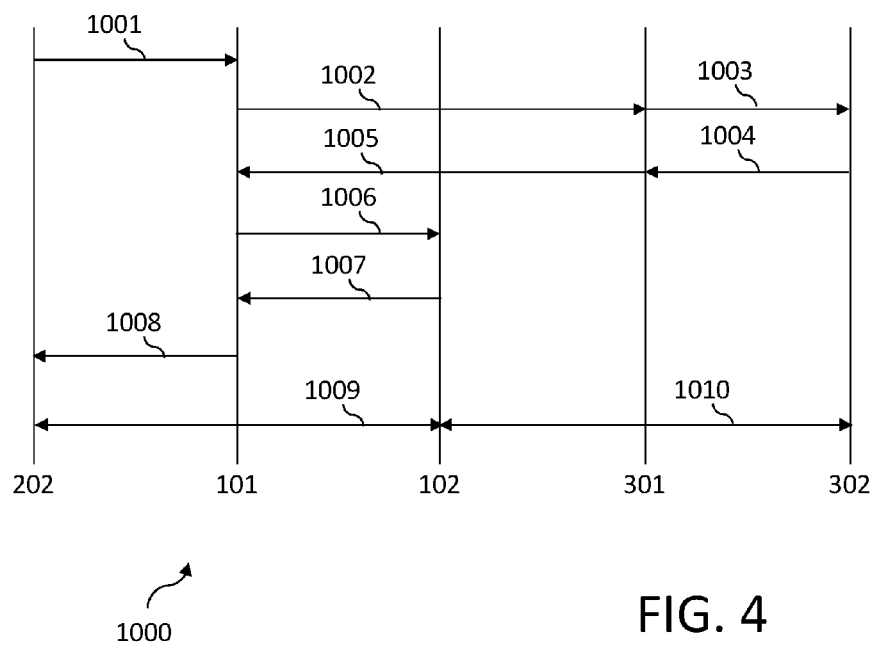
FIG. 4 is a swim line diagram illustrating the interaction of components in an example embodiment.

FIG. 4 is a swim line diagram 1000 illustrating the interaction of components in one example embodiment. The vertical lines represent components of a computer system. The arrows between the components represent communication between the components. Arrows with two ends represent a bidirectional communication exchange, arrow with one end a unidirectional communication exchange. The components represented by the vertical lines are: proxy client 202, connection management component 101, proxy service 102, virtual host 301, and virtual machine engine 302. The communication between the client device and the management device starts with the proxy client 201 sending a connection request 1001 to the connection management component 101. The connection request 1001 is directed to establishing a connection between the proxy client 202 of the client device and a remote desktop implemented as a remote virtual machine engine 302. As explained earlier the proxy client 202 may also send user credentials associated with the connection request 1001 to the connection management component. The connection management component can evaluate the user credentials (authorization data) to check if the requesting user is allowed to access the virtual machine engine 302 indicated in the connection request.

If the authorization data complies with a respective access policy available and executable on the connection management component 101, the connection management component 101 sends request 1002, 1003 for destination data of the remote virtual machine engine. The remote virtual machine engine is instantiated on a virtual host 301 which provides a hypervisor 303 for the remote virtual machine engine. The hypervisor and the remote virtual machine engine are controlled by the connection management component 101. In other words, the connection management component can take all decisions with regards to the assignment of all computing resources provided by the remote virtual machine engines to the respective client devices. It can be advantageous that the connection management component can control various virtual machine engines independent from each other in that different virtual machine engines which are assigned to different user groups can be kept completely separate from each other. This enables, for example, the users of one user group to configure their respective remote desktops without having any impact on the remote desktops of other user groups and therefore supports the multitenancy capability of the suggested system. The destination data request 1002, 1003 can be sent, as shown in the example of FIG. 4, to the virtual host 301 or to an intermediate abstraction layer (not shown) forwarding the destination data request to the virtual host.

In one embodiment, the connection management component 101 may directly communicate with one or more virtual hosts to access the respective hypervisors of the remote virtual machines running on the respective virtual host. In an alternative embodiment, an abstraction component may be added between the virtual host(s) 301 and the connection management component 101. The abstraction component may be configured to provide a further abstraction layer for the access to the virtual hosts. For example, the abstraction component can remove the virtual host view for the connection management component and simply provide a flat list of available remote virtual machines provided by all virtual hosts in the system. Therefore, the abstraction component can relieve the connection management component from the burden of first selecting a virtual host providing an appropriate virtual machine engine implementing the requested remote desktop. Instead, the connection management component can directly chose the respective remote virtual machine engine from a flat list of all possible virtual machines without the need to know the structure of virtual hosts.

The connection management component receives the destination data 1004, 1005 of the virtual machine engine in response to the destination data request 1002, 1003. Dependent of the selected embodiment the destination data may be received directly from the respective virtual host or an intermediate abstraction layer.

The virtual machine engine 302 cannot be directly accessed by the client device when the client device is trying to access it via a wide area network, such as the Internet. Therefore, the connection management component 101 facilitates establishing such a connection by sending a session request 1006 to a proxy service 102 for establishing a session with the virtual machine engine 302 through the proxy service in accordance with the authorization data. In other words, the connection management component instructs the proxy service to take all measures for becoming a wide area network enabling communication hub for the respective client device.

The proxy service 102 responds to the connection management component 101 with proxy connection data 1007 configured to allow the proxy client 202 of the client device to establish a proxy connection via the wide area network. The connection management component forwards the proxy connection data 1008 to the proxy client 202. This enables the proxy client 202 to establish a proxy connection 1009 with the proxy service 102 over the wide area network. The proxy service 102 then forwards all communication to the virtual machine engine 302.

The described method for establishing a session between a client device and a remote desktop is completely independent from the operating systems used by the client device and the virtual machines.

Figure 5:
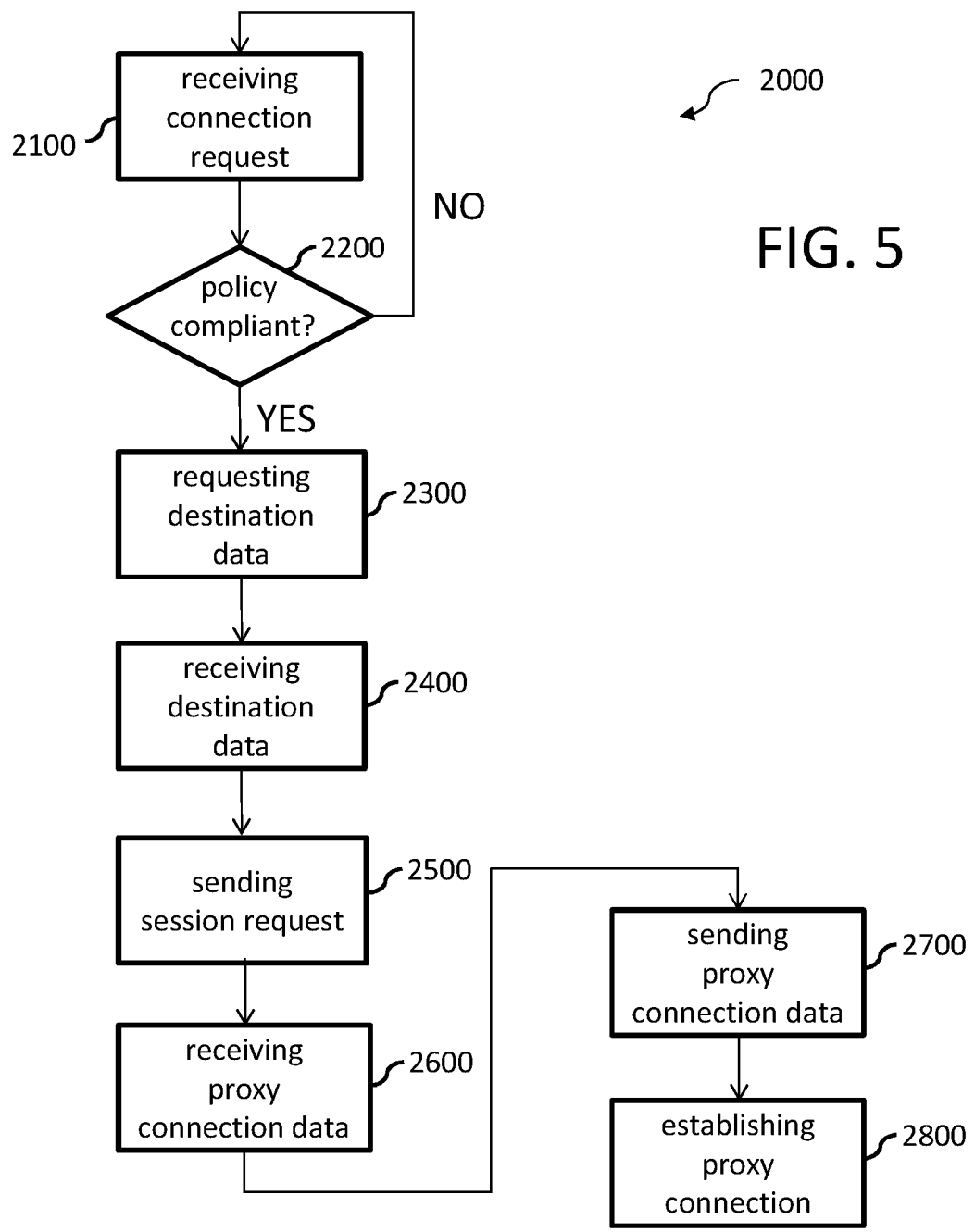
FIG. 5 is a simplified flowchart of a computer implemented method according to an example embodiment.

FIG. 5 is a simplified flowchart of a computer implemented method 2000 according to an example embodiment. FIG. 5 is a different visualization of the method described under FIG. 4. Therefore, the description of FIG. 5 is focused on the method steps at the functional level. Details regarding the implementation of the method steps are described already in the description of the previous figures.

The computer implemented method 2000 enables access of a client device to a remote desktop which is implemented as a remote virtual machine. The remote virtual machine can be selected from one or more virtual machines running on a virtual host. The method 2000 can be executed by one or more processors of a management device (cf. FIG. 1, management device 100) executing instructions of a respective computer program. The method is described from the perspective of the connection management component 101 (cf. FIG. 1) running on the management device.

The connection management component receives 2100 from the client device a connection request wherein the connection request is directed to establishing a connection between the client device and the remote virtual machine.

If authorization data associated with the connection request complies 2200 with a predefined access data structure and corresponding access rules (cf. FIG. 3, access policy 103), the connection management component requests 2300 destination data of the remote virtual machine. The remote virtual machine engine is instantiated and running on a virtual host. The virtual host provides a hypervisor for the remote virtual machine engine. The remote virtual machine engine can be controlled by the connection management component.

In response to the destination data request the connection management component receives 2400 destination data of the remote virtual machine engine. The connection management component then sends 2500 a session request to a proxy service. The session request includes or is at least based on the received destination data and requests the proxy service to establish a session with the remote virtual machine engine through the proxy service in accordance with the authorization data.

The connection management component then receives 2600 from the proxy service proxy connection data configured to allow the client device to establish a proxy connection with the proxy service via a wide area network.

The connection management component then sends 2700 the proxy connection data to the client device to enable the client device, for example through a proxy client running on the client device, to establish 2800 the proxy connection to the remote virtual machine over the wide area network. In other words, the client device is enabled to open a proxy connection over the Internet to the proxy service which again is forwarding the communication to the respective virtual machine engine implementing the remote desktop.

Optional method steps may be added to the computer implemented method 2000. For example, the connection management component may store user data of a plurality of users and may store user group data of a plurality of user groups. A user group is assigned to a subset of the plurality of users. For example, all users of one company may be assigned to a user group representing this company. The user group can then be associated with a plurality of remote virtual machines implementing remote desktops for this user group. The plurality of remote virtual machines intended to be used by a specific user group can be mapped to a user group dedicated virtual local area network for this user group. In other words, all virtual machines for a specific company can be grouped into a user group dedicated virtual local area network which has no interference with virtual machines mapped to other user groups.

There can be multiple hierarchy levels of user groups. For example, if a company has multiple subsidiaries, each subsidiary may be represented by a respective user group and the company can be represented by a user group including all user groups of the subsidiaries. The association of a user group with the respective remote virtual machines can occur at any level of the user group hierarchy. For example, the mapping of virtual machines can occur at any parent node in the user group hierarchy (e.g., the company) and is then inherited by the child nodes of the hierarchy (e.g., subsidiaries, users). This allows efficient control of various user groups or user segments through the connection management component.

Further optional method steps may include filtering connection protocols based on the access policy. For example, the predefined access data structure and corresponding access rules of the access policy can store any one of the following access rules: at least partially allow or deny display connections, allow or deny keyboard connections (maybe with key restrictions), allow or deny mouse connections, allow or deny file transfer, allow or deny clipboard transfer (for both directions separately: from the virtual machine and to the virtual machine), allow or deny USB redirection, define blacklists and/or whitelists for USB redirection device classes (such as, storage, audio, . . . ), define access time for every access rule, define client system IDs for restricting access from specific client machines, and define network blacklists/whitelists to restrict client access to specified subnets (such as a company, a provider, a city or a country). While establishing the proxy connection between the proxy client of the client device and the proxy service only such connection protocols may be enabled which are allowed by the access rules for the received authorization data.

Method steps can be performed by one or more programmable processors executing a computer program to perform functions by operating on input data and generating output. Method steps can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments can be implemented on a computer having a display device, e.g., a cathode ray tube (CRT) or liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Client computers can also be mobile devices, such as smartphones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer implemented method for enabling access of a client device to a remote desktop implemented within a remote virtual machine engine selected from one or more virtual machine engines running on a virtual host, the method comprising:
   receiving, from the client device, a connection request for establishing a connection between a proxy client of the client device and the selected remote virtual machine engine;
   if authorization data associated with the connection request complies with a predefined access data structure and corresponding access rules, requesting, directly from the virtual host, destination data identifying the selected remote virtual machine engine in the virtual host;
   receiving, directly from the virtual host, the destination data identifying the selected remote virtual machine engine in the virtual host;
   sending, to a proxy service, a session request based on the destination data identifying the selected remote virtual machine engine for establishing a session with the selected remote virtual machine engine through the proxy service in accordance with the authorization data;
   receiving, from the proxy service, proxy connection data configured to allow the client device to establish a proxy connection for the session with the selected remote virtual machine engine in the virtual host via a wide area network independently of operating systems used by the client device and the selected remote virtual machine engine; and
   sending the proxy connection data to the client device to enable the client device to establish the proxy connection for the session with the selected remote virtual machine engine over the wide area network and to directly control the selected remote virtual machine engine through the session.

2. The computer implemented method of claim 1, wherein access from the proxy service to the selected virtual machine engine occurs via a hypervisor running on the virtual host and being associated with the virtual machine engine.

3. The computer implemented method of claim 1, further comprising:
   establishing the proxy connection between the proxy client of the client device and the proxy service, wherein the proxy connection includes a secure connection and the proxy service continuously listens to standard ports.

4. The computer implemented method of claim 1, further comprising:
the proxy service receiving, from the proxy client of the client device, a data optimization indicator which is based on technical constraints of the client device; and
the proxy service pushing optimization methods for the proxy connection to the proxy client on the client device, the optimization methods selected from a predefined set of optimization protocols wherein a specific optimization protocol is associated with the data optimization indicator.

5. The computer implemented method of claim 1, wherein the proxy connection is identified by a unique identifier.

6. The computer implemented method of claim 1, further comprising:
storing user data of a plurality of users and storing user group data of a plurality of user groups wherein a user group has a subset of the plurality of users and is associated with a plurality of remote virtual machine engines; and
mapping the plurality of remote virtual machine engines to a user group dedicated virtual local area network.

7. The computer implemented method of claim 6, wherein the plurality of user groups is arranged in a group hierarchy in which at least one user group is a parent of the user group and the mapping of the plurality of remote virtual machine engines to the plurality of users within the user group occurs at the parent user group.

8. The computer implemented method of claim 1, wherein the predefined access data structure and corresponding access rules store any one or more of the following access rules:
at least partially allow or deny display connections, allow or deny keyboard connections, allow or deny mouse connections, allow or deny file transfer, allow or deny clipboard, allow or deny USB redirection, define blacklists and/or whitelists for USB redirection device classes, define access time for every access rule, define client system IDs for restricting access from specific client machines, and define network blacklists/whitelists to restrict client access to specified subnets; and
while establishing the proxy connection, enabling only connection protocols allowed by the access rules for the received authorization data.

9. A computer system for enabling access of a client device to a remote desktop implemented as an operating system running in a remote virtual machine engine selected from one or more virtual machine engines running in a virtual host, the system comprising:
a processor;
a memory;
a connection management component including:
a management interface configured to receive, from the client device, a connection request for establishing a connection between the client device and the selected remote virtual machine engine;
an access policy component configured to evaluate authorization data associated with the connection request for compliance with a predefined access data structure and corresponding access rules; and
a requestor component configured to request, directly from the virtual host, destination data identifying the selected remote virtual machine engine in the virtual host in case of compliance,
wherein the management interface is further configured to:
receive, directly from the virtual host, the destination data identifying the selected remote virtual machine engine in the virtual host;
send, to a proxy service, a session request based on the destination data; and
send proxy connection data to the client device to enable the client device to establish a proxy connection for the session with the selected remote virtual machine engine in the virtual host over a wide area network independently of operating systems used by the client device and the selected remote virtual machine engine, and to directly control the selected remote virtual machine engine through the session; and
a proxy service component hosting the proxy service, wherein the proxy service component is configured to receive the session request, and in response to the session request, send, to the management interface, the proxy connection data to enable the client device to establish the proxy connection via the wide area network.

10. The computer system of claim 9, wherein the proxy service component is configured to communicate with the selected remote virtual machine engine via a hypervisor running on the virtual host and being associated with the selected remote virtual machine engine.

11. The computer system of claim 9, wherein the connection management component further comprises:
a user data structure configured to store user data of a plurality of users and to store user group data of a plurality of user groups, wherein a user group has a subset of the plurality of users and is associated with a plurality of remote virtual machine engines; and
a mapping component configured to map the plurality of remote virtual machine engines to a user group dedicated virtual local area network.

12. The computer system of claim 11, wherein:
the plurality of user groups is arranged in a group hierarchy where at least one user group is a parent of the user group and the mapping of the plurality of remote virtual machine engines to the plurality of users within the user group occurs at the parent user group.

13. The computer system of claim 12, wherein:
a user of the user group is allowed to control access control structures of the parent user group.

14. The computer system of claim 12, wherein:
a user of the parent user group is enabled to access the remote virtual machine engines associated with the child user group.

15. A non-transitory computer readable storage medium having instructions stored thereon, including instructions which, when executed by at least one processor of a computer system, cause the computer system to:
Receive, from the client device, a connection request for establishing a connection between a proxy client of the client device and a selected remote virtual machine engine hosted on a virtual host;
if authorization data associated with the connection request complies with a predefined access data structure and corresponding access rules, request, directly from the virtual host, destination data identifying the selected remote virtual machine engine;
receiving, directly from the virtual host, the destination data identifying the selected remote virtual machine engine in the virtual host;
receive, directly from the virtual host, the destination data identifying the selected remote virtual machine engine in the virtual host;

send, to a proxy service, a session request based on the destination data identifying the selected remote virtual machine engine for establishing a session with the selected remote virtual machine engine through the proxy service in accordance with the authorization data;

receive, from the proxy service, proxy connection data configured to allow the client device to establish a proxy connection for the session with the selected remote virtual machine engine in the virtual host via a wide area network independently of operating systems used by the client device and the selected remote virtual machine engine; and send the proxy connection data to the client device to enable the client device to establish the proxy connection over the wide area network and to directly control the selected remote virtual machine engine through the session.

16. The non-transitory computer readable storage medium of claim 15, wherein access from the proxy service to the selected virtual machine engine occurs via a hypervisor running on the virtual host and being associated with the selected virtual machine engine.

17. The non-transitory computer readable storage medium of claim 15, wherein the instructions, when loaded into the memory of the computer system and executed by the at least one processor of the computer system, further cause the computer system to:

establish the proxy connection between a proxy client of the client device and the proxy service wherein the proxy connection includes a secure connection and the proxy service continuously listens to standard ports.

18. The non-transitory computer readable storage medium of claim 15, wherein:

the proxy service is configured to receive from the proxy client a data optimization indicator that is based on technical constraints of the client device; and the proxy service is configured to push optimization methods for the proxy connection to the proxy client on the client device, the optimization methods selected from a predefined set of optimization protocols wherein a specific optimization protocol is associated with the data optimization indicator.

19. The non-transitory computer readable storage medium of claim 15, wherein the proxy connection is identified by a unique identifier.

20. The non-transitory computer readable storage medium of claim 15, wherein the instructions, when executed by the at least one processor of the computer system, further cause the computer system to:

store user data of a plurality of users and store user group data of a plurality of user groups, wherein a user group has a subset of the plurality of users and is associated with a plurality of remote virtual machine engines; and map the plurality of remote virtual machines engines to a user group dedicated virtual local area network.

* * * * *

UNITED STATES PATENT AND TRADEMARK OFFICE
CERTIFICATE OF CORRECTION

PATENT NO. : 9,973,511 B2
APPLICATION NO. : 14/966796
DATED : May 15, 2018
INVENTOR(S) : Ott et al.

Page 1 of 1

It is certified that error appears in the above-identified patent and that said Letters Patent is hereby corrected as shown below:

In the Claims

In Column 16, Line 53, Claim 15, delete "Receive," and insert -- receive, --, therefor.

In Column 16, Lines 62-67, Claim 15, delete
"receiving, directly from the virtual host, the destination
    data identifying the selected remote virtual machine
    engine in the virtual host;
receive, directly from the virtual host, the designation data
    identifying the selected remote virtual machine engine
    in the virtual host;" and insert
-- receive, directly from the virtual host, the destination data
    identifying the selected remote virtual machine engine
    in the virtual host; --, therefor.

Signed and Sealed this
Fourteenth Day of August, 2018

Andrei Iancu
*Director of the United States Patent and Trademark Office*